(No Model.) 3 Sheets—Sheet 1.
A. W. MESTON.
COMMUTATOR FOR DYNAMO ELECTRIC MACHINES AND METHOD OF CONSTRUCTING SAME.
No. 493,439. Patented Mar. 14, 1893.
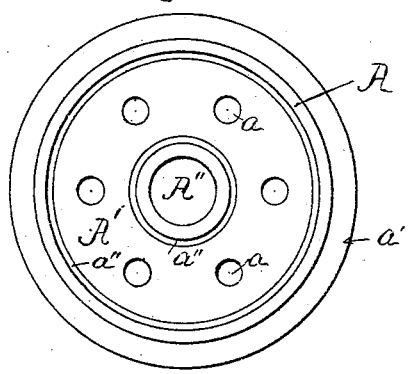
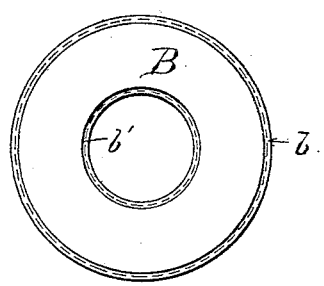
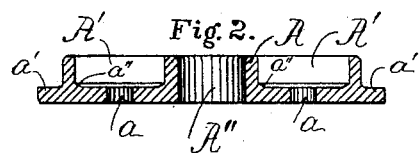
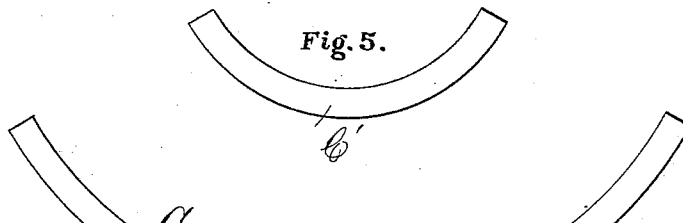
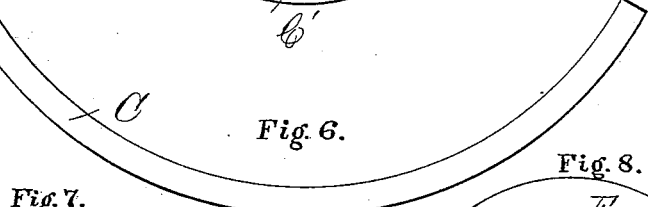
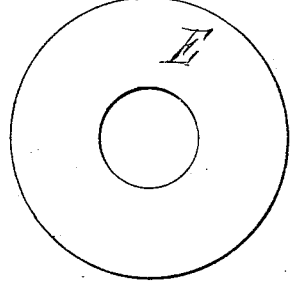
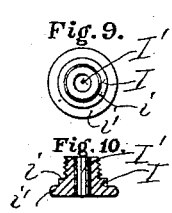
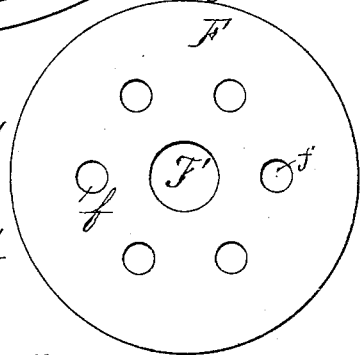
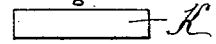
Witnesses
A. Ramel
F. F. Cornwall
Inventor
Alexander W. Meston
By his Attorney
Paul Bakewell
THE NORRIS PETERS CO., PHOTO-LITHO., WASHINGTON, D. C.

(No Model.) 3 Sheets—Sheet 2.

A. W. MESTON.
COMMUTATOR FOR DYNAMO ELECTRIC MACHINES AND METHOD OF CONSTRUCTING SAME.

No 493,439. Patented Mar. 14, 1893.

Witnesses
A. Ramel
F. R. Cornwall

Inventor
Alexander W. Meston
By his Attorney Paul Bakewell (No Model.) 3 Sheets—Sheet 3.
A. W. MESTON.
COMMUTATOR FOR DYNAMO ELECTRIC MACHINES AND METHOD OF CONSTRUCTING SAME.
No. 493,439. Patented Mar. 14, 1893.
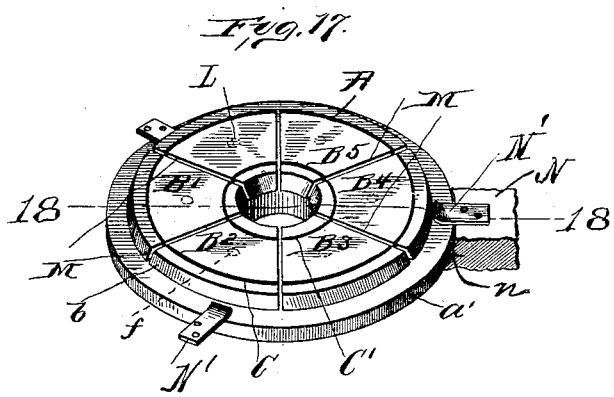
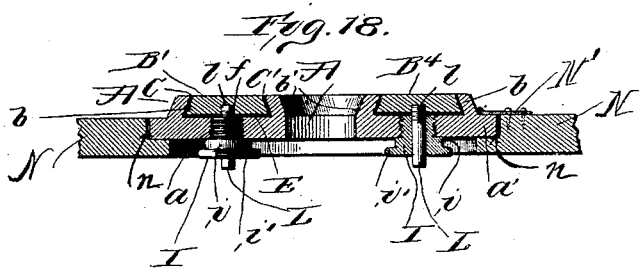

UNITED STATES PATENT OFFICE.

ALEXANDER W. MESTON, OF ST. LOUIS, MISSOURI, ASSIGNOR TO THE EMERSON ELECTRIC MANUFACTURING COMPANY, OF MISSOURI.

COMMUTATOR FOR DYNAMO-ELECTRIC MACHINES AND METHOD OF CONSTRUCTING SAME.

SPECIFICATION forming part of Letters Patent No. 493,439, dated March 14, 1893.

Application filed September 12, 1892. Serial No. 445,629. (No model.)

*To all whom it may concern:*

Be it known that I, ALEXANDER W. MESTON, a citizen of the United States, residing in the city of St. Louis and State of Missouri, have invented certain new and useful Improvements in Commutators for Dynamo-Electric Machines and Methods of Constructing the Same, of which the following is a full, clear, and exact description.

My invention relates to commutators for dynamos and motors, and has for its object, as a new article of manufacture, a commutator, that, in its application, can be considered as inseparable in its several parts; one that, in its entirety, is adapted to be used and applied as a single piece; simple and easily constructed; and one which, in use, is efficiently insulated between its segments and not likely to become cross-connected in any way.

It consists in the novel features in the construction hereinafter described.

In the accompanying drawings, in which like characters of reference denote like parts in the several figures, I have preferably shown the constituent parts of my commutator on the first sheet—Figures 1 to 12, inclusive, and, on a second sheet, the several parts assembled, illustrative of the principles of construction and method of assemblage of the parts illustrated in the first sheet. In the first sheet, Figs. 1, 2, 3, 4, and 12 are illustrative of the metal parts, and Figs. 5 to 11, inclusive, of the insulating parts, of my improved commutator.

Figure 13:
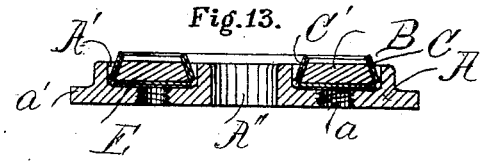
Figure 14:
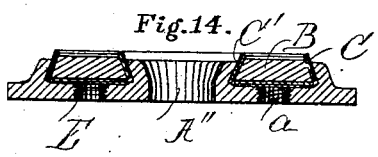
Figure 15:
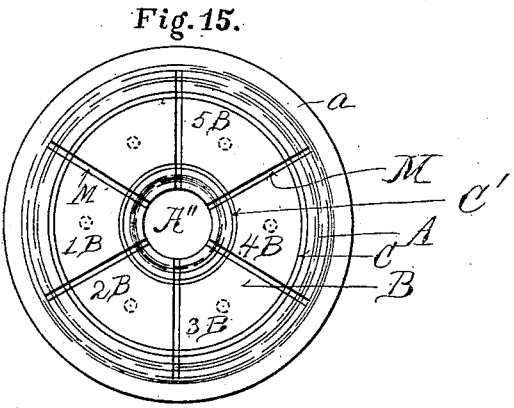
Figure 16:
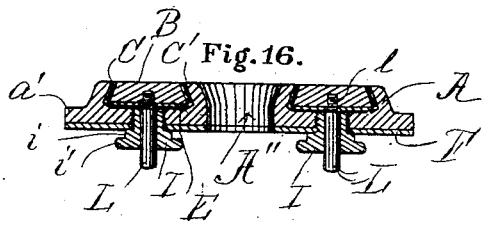

Figs. 1 and 2 are, respectively, a plan-view and a diametrical section of the circular or disk supporting-plate. Figs. 3 and 4 are, respectively, a plan-view and a diametrical section of the annular plate from which the segments are composed. Figs. 5 and 6 are plan-views, when laid flat, of the insulation between the edges of the segmental ring-piece and the disk plate. Fig. 7 is a plan-view of the annular-shaped insulation-plate used to insulate the flat side of the segmental ring-piece from the disk plate. Fig. 8 is a plan-view of the circular insulation-plate placed on the reverse side of the disk plate. Figs. 9 and 10 are, respectively, a plan-view and a diametrical section of the insulation bushing designed to insulate the terminal connections from the disk plate. Fig. 11 is a plan-view of the insulating strips which are placed between the different segments. Fig. 12 is a side elevational view of the terminal studs or pins secured to the different segments of the commutator. Fig. 13 is a diametrical section of the disk plate and the annular segment-piece, and the insulation-pieces therebetween, assembled prior to their being secured together. Fig. 14 is a view similar to Fig. 13, showing, however, the parts secured together, as hereinafter described. Fig. 15 is a plan-view of what is shown in Fig. 14, with the additional feature of having the radial slots sawed, dividing the ring-piece into the different segments; and Fig. 16 is a diagrammatical section of the complete commutator, showing the terminal pins secured to the segments. Fig. 17 is a perspective view of a disk commutator of my improved form of construction, illustrating, also, the adaptation of the lip in the edge of the same for revolubly supporting the commutator, as a whole. Fig. 18 is a sectional view, taken as on the line 18—18 in Fig. 17.

In the drawings, I have illustrated the adaptation of my method of construction to the simplest form of commutator, a disk commutator, with which the brushes, preferably carbon, make contact on the side face thereof—a form to which my method of construction is peculiarly suited. I do not, however, desire to be understood as limiting myself in such features as are novel and evidently applicable to the construction of other forms of commutators in general, to their application to the construction of a disk commutator.

A represents a circular plate, formed as shown in Figs. 1 and 2, with a central perforation A'', in instances where the commutator is placed concentric to the shaft of the machine, to accommodate the same. The piece, as a whole, is formed with a projecting lip-portion $a'$, by which the commutator, as a whole, is held in place, in any desirable manner, and, when required, so that the commutator as a whole, can be revolved, the plate A acting in the capacity of a supporting-plate for the commutator when assembled. This feature of the adaptation of the lip $a'$ to revolubly support the plate A in place is illustrated in Figs. 17 and 18, in which N represents a projecting portion of the framing of the dynamo or motor to which the commutator is adapted, in the edge of which is formed a guide-way $n$, adapted to receive the lip $a'$ and formed concentric with the center of the piece A, the lip $a'$ being revolubly retained in position by any convenient means, preferably by the spring clips $N'$, as shown in Fig. 18.

In one side face of the plate A is formed the annular groove $A'$ to receive the segment ring. The side walls of this groove are vertical in the first instance, as shown in Fig. 2, the lower corners, as $a''$ being left slightly filled in, approximately at an angle of forty-five degrees. The material of the piece A, forming the bottom of the groove $A'$, is perforated at a number of places, as at $a$, corresponding to the number of segments it is desired to have in the commutator when completed. These holes $a$ are placed, preferably, midway between the side walls of the groove $A'$ and disposed circumferentially so as to divide the circle on which they are arranged equally.

The supporting-piece A, as just described, is preferably cast in substantially the form described—with the groove $A'$, the axial perforation $A''$, and the holes $a$—very little finishing being necessary thereafter to prepare it for the accommodation of the other parts.

B represents an annular piece of which the segments are formed, when the commutator is completed. It is formed with the inner and outer edges inclined or beveled off, as at $b$ and $b'$. The lower corners of these edges are also beveled off slightly, as at $b''$, to correspond with the corners $a''$ of the bottom of the groove $A'$. The ring-piece B is preferably cast in substantially the form described, and then, subsequently, coined into the exact form and size. The width of the ring B corresponds, approximately, to the radial space in the groove $A'$, leaving room, when the parts are assembled, as hereinafter described, to accommodate the edge insulation-strips. The thickness is such that, when the parts are assembled, as hereinafter described, there will be material left above the upper edges of the side-walls of the groove $A'$ for finishing purposes.

C and $C'$ represent the strips of some insulating material, as thin sheet mica, rubber, or, preferably, vulcanized fiber. They are of a form that, when placed around and inside, respectively, the piece B, they will conform to the inclined edges $b$ and $b'$ of the same, as shown in Fig. 13, when the ends of the strips are brought together. Their shape, as shown in Figs. 5 and 6, corresponds, respectively, to the surfaces of the frustums of cones of which the inclined edges $b$ and $b'$, of the ring-piece B, form the bottoms. Their width is preferably somewhat more than the thickness of the ring-piece B.

E represents an annular piece of sheet insulation of dimensions corresponding to the bottom of the groove $A'$, and, when the parts are assembled, is designed to insulate the bottom of the ring B from the piece A.

F represents a circular disk of sheet insulation, corresponding in diameter to the bottom of the piece A to which it is secured when the parts are assembled, as shown in Fig. 16. The sheet, as a whole, is formed with holes $f$, corresponding to the holes $a$ in the piece A, and a central perforation corresponding to the central axial perforation $A''$ in the piece A.

I, Figs. 9 and 10, represents a bushing of insulating material, which is secured in the holes $a$ in the piece A, preferably by having one end of the bushing threaded and screwing it into the holes $a$, which, for this reason, are reamed out, and correspondingly threaded, as shown in Fig. 16. The bushing I is formed with a central perforation $I'$ for the accommodation of the terminal pins, to be described. The sides of the bushings are formed, first, with shoulder $i$ which abuts against the material of the plate A, or, rather, against the interposed insulation-plate F (see Fig. 16), when the bushing I is screwed home, and, secondly, with the flange-edge $i'$, forming a shoulder for retaining wires in place on the rear side of the commutator when connected up.

K, Fig. 11, represents one of the strips of insulating material which are placed between the segments in the saw-cuts by which the ring B is divided into different segments, as hereinafter described.

L, Fig. 12, represents a pin, which is preferably screw-threaded on one end, as the means for securing the pin to the segments, being passed through the insulation bushings I, and projecting from the rear side of the commutator when the commutator is assembled, as shown in Fig. 16.

The insulation pieces C, $C'$, and E, are, preferably, made in duplicate, one set being made of material corresponding to vulcanized fiber, and the other of mica, and the two used together as one piece, in each instance, placing the mica next to the ring-piece B, in order that, when used, the other parts or the commutator and the other insulation will be more efficiently protected from the heat which is generally developed, to a greater or less degree, in the segmental parts of the ring-piece B.

The several parts of the commutator are assembled in the following manner:—The piece A is roughly finished in the lathe on the edge $a'$, and the holes $a$ tapped. The interior of the groove is preferably left rough as it comes from the sand, in order to bind the parts more rigidly together. The edges and side faces of the piece B are in good condition as they leave the coining-press, not requiring any finishing. The bottom of the groove A' is sprinkled with powdered shellac, then the annular insulation sheets E are laid in the bottom of the groove A', first the fiber and then the mica, and the upper surface of this sprinkled with powdered shellac. The ring-piece B is placed in the groove A' over the insulation sheets. The sets of insulation-strips C and C' are then placed around and inside, respectively, the edges $b$ and $b'$ of the ring-piece B—the mica strips next to the ring-piece B—as shown, in Fig. 13. All the remaining vacant space in the groove A' is then filled in with powdered shellac. The parts thus assembled are then subjected to heat sufficiently intense to thoroughly melt the shellac, and while the shellac is still in its melted state, they are placed in a die-press, which, while it firmly holds the insulation-strip C and C' in place, preventing their raising, upsets, or turns over, the side walls of the groove A' on to the inclined edges $b$ and $b'$ of the ring-piece B, firmly securing the same in the groove A', in the manner illustrated in Fig. 14. When the shellac cools, the parts are firmly bound together as one solid piece. These assembled parts are then chucked, and the front side surface turned off flush, corresponding to what is shown in Fig. 16. They are then, as a whole, chucked in a milling-machine, or any other suitable machine, and radial slots M cut in the front side face of the same to a depth which will subdivide the ring-piece B into any desired number of similar segments $1^b$, $2^b$, &c., as shown in Fig. 15. In this instance, the piece is so chucked as to bring the holes $a$ midway between the cuts or slots M, as shown in dotted lines in Fig. 15. Strips of insulation corresponding to K, after having been heavily coated with a thick liquid shellac, are then forced in the slots M, and the whole piece again subjected to the action of a die-press, similar to the one in which the side walls of the groove A' were upset on to the piece B, except that, in this instance, it only operates on the outer wall of the groove A', tending to force the segments $1^B$, $2^B$, &c., radially inward, thereby securely binding the strips K in the slots M. Holes are then formed in the under or rear side of the segments $1^B$, $2^B$, &c., concentrically with the holes $a$ in the supporting-piece A, for the insertion of the ends of the terminal pins L, the holes being, preferably, screw-threaded, corresponding to the screw end of the pins L, as the simplest means of securing the pins to the segments. These holes do not, preferably, extend through to the face of the segments, in order to leave the face smooth. The circular insulation-plate F is placed in contact with the under or rear side of the plate A, the holes $f$ in the plate F registering with the holes $a$ in the plate A. The bushings I are then screwed home, and the pins L finally secured in place. The use of thus providing terminals—the pins L—from the segments $1^B$, $2^B$, &c., projecting from the back of the commutator, is evident, the brushes revolving in contact with the face side, practically preventing their being led out from that side.

I claim—

1. As a new article of manufacture, the herein-described commutator for dynamo-electric machines, consisting in the combination with an annular supporting-plate, provided with an annular groove in one side face of the same, of a segmental contact-ring secured in the said annular groove and insulated from the said supporting-plate: substantially as and for the purposes described.

2. As a new article of manufacture, the herein-described commutator for dynamo-electric machines, consisting in the combination with a disk or annular supporting-plate, provided with an annular groove in one side face of the same, and a radially-extending, circumferential lip-portion, of a segmental contact-ring secured in the said annular groove, and insulated from the supporting-plate: substantially as and for the purposes described.

3. As a new article of manufacture, the herein-described commutator for dynamo-electric machines, consisting in the combination with an annular or disk supporting-plate, provided with means for supporting the same, and an annular groove in one side face of the same, of a segmental contact-ring secured in the said groove, and insulated from the supporting-plate: substantially as and for the purposes described.

4. As a new article of manufacture, the herein-described commutator for dynamo-electric machines, consisting in the combination with a disk or annular supporting-plate provided with a circumferential lip extension, by which the plate is revolubly supported in place, of a segmental contact-ring secured on one of the side faces of the same, and insulated therefrom: substantially as and for the purposes described.

5. As a new article of manufacture, the herein-described commutator, consisting in the combination with a revoluble supporting-plate, of a series of insulated contact-segments secured to one of the side faces of the said plate, concentric thereto: substantially as and for the purposes described.

6. As a new article of manufacture, the herein-described commutator for dynamo-electric machines, consisting in the combination with a revoluble supporting-plate, of a series of insulated contact-segments secured to one side face of the said plate, concentric to the same, arranged in pairs diametrically opposite each other: substantially as and for the purposes described.

7. As a new article of manufacture, the herein-described commutator for dynamo-electric machines, consisting in the combination with a disk or annular supporting-plate, formed with an annular groove in one side face of the same, of a segmental contact-ring secured in the said groove, an annular insulation-plate in the bottom of the groove, and insulation-strips between the side walls of the groove and the edges of the segmental contact-ring: substantially as and for the purposes described.

8. As a new article of manufacture, the herein-described commutator for dynamo-electric machines, consisting in the combination with a disk or annular supporting-plate, formed with an annular groove in one side face of the same, of a segmental contact-ring secured in the said groove, an annular insulation-plate in the bottom of the groove, insulation-strips between the side walls of the groove and the edges of the segmental ring, and insulation-strips between the different segments: substantially as and for the purposes described.

9. As a new article of manufacture, the herein-described commutator for dynamo-electric machines, consisting in the combination with an annular disk supporting-plate, a series of insulated contact-plates secured on one side face of the same, and insulated terminal connections leading from the contact-segments to the reverse side of the supporting-plate: substantially as and for the purposes described.

10. As a new article of manufacture, the herein-described commutator for dynamo-electric machines, consisting in the combination with an annular or disk supporting-plate, of an insulated segmental contact-ring secured on one side face of the same, insulated terminal connections from the contact-segments protruding from the reverse side of the supporting-plate, and an insulation-sheet secured on the reverse side of the supporting-plate: substantially as and for the purposes described.

11. The herein-described method of constructing a disk commutator, consisting in fitting an annular-shaped contact piece with inclined circumferential edges into a correspondingly-shaped groove, formed with vertical side walls, in one side face of a supporting piece, and in subsequently upsetting the side walls of the groove onto the inclined edges of the contact piece, substantially as and for the purposes specified.

12. The herein-described method of constructing a disk commutator, consisting in embedding an annular-shaped piece, of which the contact-segments are composed, formed with inclined edges, in an annular groove in one side face of a disk supporting-plate, and in securing the annular-shaped piece, with interposed insulation, in the said groove, by upsetting the side walls of the groove onto the inclined edges of the same: substantially as and for the purposes described.

13. The herein-described method of constructing a disk commutator, consisting in embedding an annular-shaped piece, formed with inclined edges, in an annular groove formed in one side face of a disk supporting-plate and in securing the annular-shaped piece, with interposed insulation, in the groove by upsetting the side walls of the groove onto the inclined edges of the same, and in subsequently dividing the annular-shaped piece into the separate contact-segments: substantially as and for the purposes described.

14. The herein-described method of constructing a commutator, consisting in embedding the contact-piece, formed with inclined edges, of which the sections are composed, in a groove formed therefor in the supporting-piece, and in securing the contact-piece, with interposed insulation, in the said groove by upsetting the side walls of the groove on to the inclined edges of the contact-piece: substantially as and for the purposes described.

15. The herein-described method of constructing a commutator, consisting in embedding the contact-piece, formed with inclined edges, in a groove formed therefor in the supporting-piece, in securing the contact-piece, with interposed insulation, in the groove by upsetting the side walls of the same onto the inclined edges of the contact-piece, and in subsequently dividing the contact-piece into the different segments: substantially as and for the purposes described.

16. The herein-described method of constructing a disk commutator, consisting in embedding an annular-shaped piece, formed with inclined edges, in an annular groove formed therefor, in one side face of a supporting-plate, securing the said annular piece, with interposed insulation, in the groove by upsetting the side walls of the groove onto the inclined edges of the annular piece, dividing the annular-shaped piece into a number of segments by radial slots, inserting insulation in the said slots, and subsequently forcing the segments inwardly by further upsetting the outer wall of the annular groove: substantially as and for the purposes described.

17. In a commutator consisting in a supporting-plate, to which the different sections of the contact-plate are secured, the herein-described means for insulating the segmental plate from the supporting-plate, consisting in the combination of a similar sheet, or sheets, of vulcanized fiber, or like material, and mica, the mica being placed next to the contact-plate or plates: substantially as and for the purposes described.

18. In electrical apparatus, the herein-described method for insulating separate metallic parts one from the other, consisting in interposing therebetween one, or more, sheets of insulating material, sprinkling all contacting parts, insulation and otherwise, and filling all crevices therebetween, with powdered shellac, subjecting all the parts thus assembled together to the action of heat, and subsequently securing the metallic parts together mechanically: substantially as and for the purposes described.

In testimony whereof I hereunto affix my signature, in presence of two witnesses, this 5th day of August, 1892.

ALEXANDER W. MESTON.

Witnesses:
    A. RAMEL,
    H. K. WAGNER.